(12) United States Patent
Low et al.

(10) Patent No.: US 7,860,772 B2
(45) Date of Patent: Dec. 28, 2010

(54) FUNDING ON-LINE ACCOUNTS

(75) Inventors: Gak-Wee Low, Sunnyvale, CA (US);
Tejas Arvindbhai Kotecha, Santa Clara, CA (US); Salil Mody, Mountain View, CA (US)

(73) Assignee: eBay, Inc., San Jose, CA (US)

( * ) Notice: Subject to any disclaimer, the term of this patent is extended or adjusted under 35 U.S.C. 154(b) by 101 days.

(21) Appl. No.: 12/241,688

(22) Filed: Sep. 30, 2008

(65) Prior Publication Data

US 2010/0082468 A1   Apr. 1, 2010

(51) Int. Cl.
*G06Q 40/00*   (2006.01)
(52) U.S. Cl. .............................. 705/35; 705/38; 705/18; 705/65; 705/41; 235/380
(58) Field of Classification Search .................. 705/39; 709/206; 235/379
See application file for complete search history.

(56) References Cited

U.S. PATENT DOCUMENTS

| | | | | |
|---|---|---|---|---|
| 4,960,981 A | * | 10/1990 | Benton et al. ................. | 705/41 |
| 5,175,416 A | * | 12/1992 | Mansvelt et al. ............. | 235/379 |
| 5,465,206 A | * | 11/1995 | Hilt et al. ...................... | 705/40 |
| 5,590,196 A | * | 12/1996 | Moreau ........................ | 705/78 |
| 5,649,117 A | * | 7/1997 | Landry ......................... | 705/40 |
| 5,659,165 A | * | 8/1997 | Jennings et al. ............. | 235/379 |
| 5,677,955 A | * | 10/1997 | Doggett et al. ............... | 705/76 |
| 5,699,528 A | * | 12/1997 | Hogan .......................... | 705/40 |
| 5,745,886 A | * | 4/1998 | Rosen .......................... | 705/39 |
| 5,757,917 A | * | 5/1998 | Rose et al. .................... | 705/79 |
| 5,825,003 A | * | 10/1998 | Jennings et al. ............. | 235/379 |
| 5,826,241 A | * | 10/1998 | Stein et al. ................... | 705/26 |
| 5,845,265 A | * | 12/1998 | Woolston ...................... | 705/37 |
| 5,848,400 A | * | 12/1998 | Chang .......................... | 705/35 |
| 5,870,473 A | * | 2/1999 | Boesch et al. ................ | 705/78 |
| 5,884,288 A | * | 3/1999 | Chang et al. ................. | 705/40 |
| 5,884,290 A | * | 3/1999 | Smorodinsky et al. ....... | 705/44 |
| 5,897,621 A | * | 4/1999 | Boesch et al. ................ | 705/26 |
| 5,913,203 A | * | 6/1999 | Wong et al. .................. | 705/39 |
| 5,920,847 A | * | 7/1999 | Kolling et al. ............... | 705/40 |
| 5,956,700 A | * | 9/1999 | Landry ......................... | 705/40 |

(Continued)

OTHER PUBLICATIONS

Center for Financial Services Innovation, The Power of Experience in Understanding the Underbanked Market (Underbanked).*

(Continued)

*Primary Examiner*—Ella Colbert
*Assistant Examiner*—Chika Ojiaku
(74) *Attorney, Agent, or Firm*—Haynes and Boone, LLP.

(57) ABSTRACT

A system generates an identifier when a consumer deposits cash, where a new unique identifier is generated with each transaction. The consumer receives the identifier and the identifier (along with the amount of cash deposit) is communicated to a payment provider for storage. The consumer may then access and fund an on-line account with the financial services provider by first accessing the account and entering the unique character identifier, which the system processes. If the identifier is valid, e.g., an actual stored identifier within the system associated with a cash amount, then the system transfers that amount to the consumer's account. At this point, the consumer may use the account to make an on-line transaction or purchase with the newly funded amount.

26 Claims, 3 Drawing Sheets

U.S. PATENT DOCUMENTS

| | | | |
|---|---|---|---|
| 5,963,647 A * | 10/1999 | Downing et al. | 705/39 |
| 6,041,315 A * | 3/2000 | Pollin | 705/45 |
| 6,105,008 A | 8/2000 | Davis et al. | |
| 6,243,689 B1 * | 6/2001 | Norton | 705/18 |
| 6,805,289 B2 | 10/2004 | Noriega et al. | |
| 7,529,706 B2 * | 5/2009 | Kulasooriya et al. | 705/37 |
| 7,644,037 B1 * | 1/2010 | Ostrovsky | 705/40 |
| 2002/0103678 A1 * | 8/2002 | Burkhalter et al. | 705/4 |
| 2005/0060236 A1 * | 3/2005 | Iulo | 705/26 |
| 2006/0149667 A1 * | 7/2006 | Barry | 705/39 |
| 2006/0195567 A1 * | 8/2006 | Mody et al. | 709/224 |
| 2007/0136109 A1 * | 6/2007 | Yager et al. | 705/4 |

OTHER PUBLICATIONS

Liz Gunnison et. al. Prepare to Lose Your Wallet, Aug. 14, 2007, www.portfolio.com (Portfolio).*

* cited by examiner

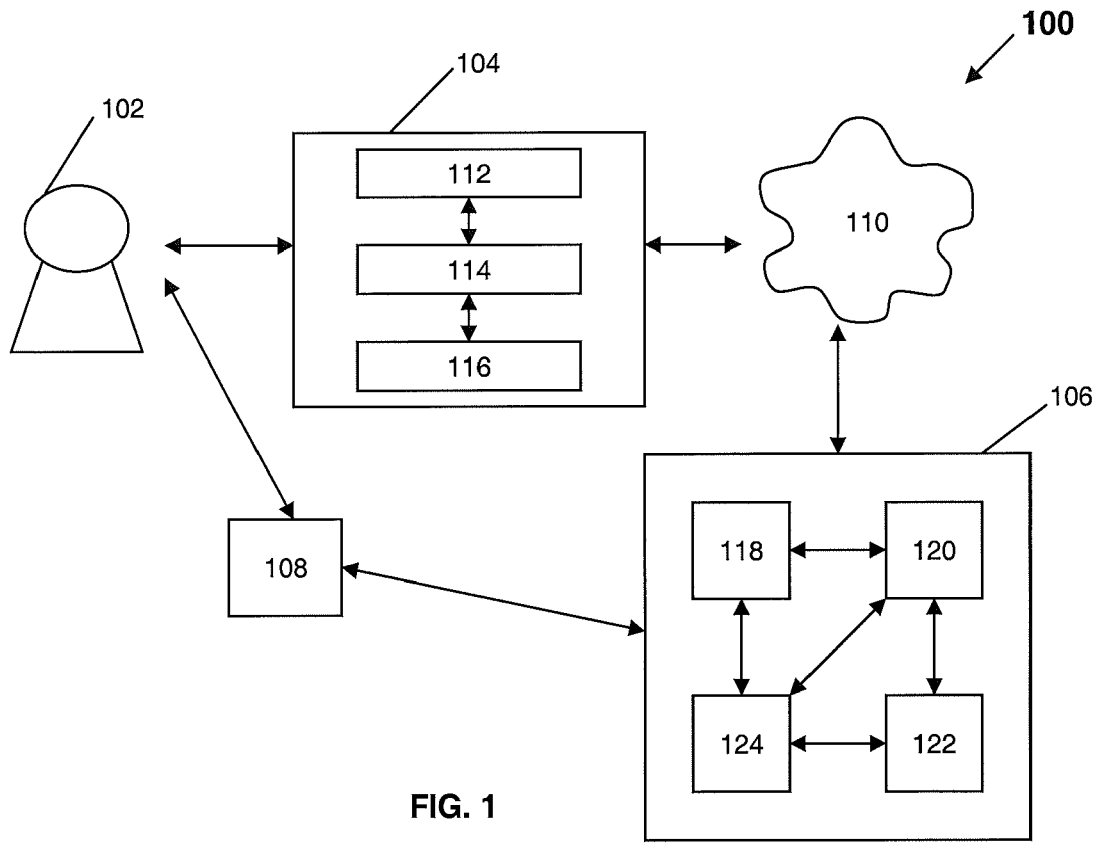
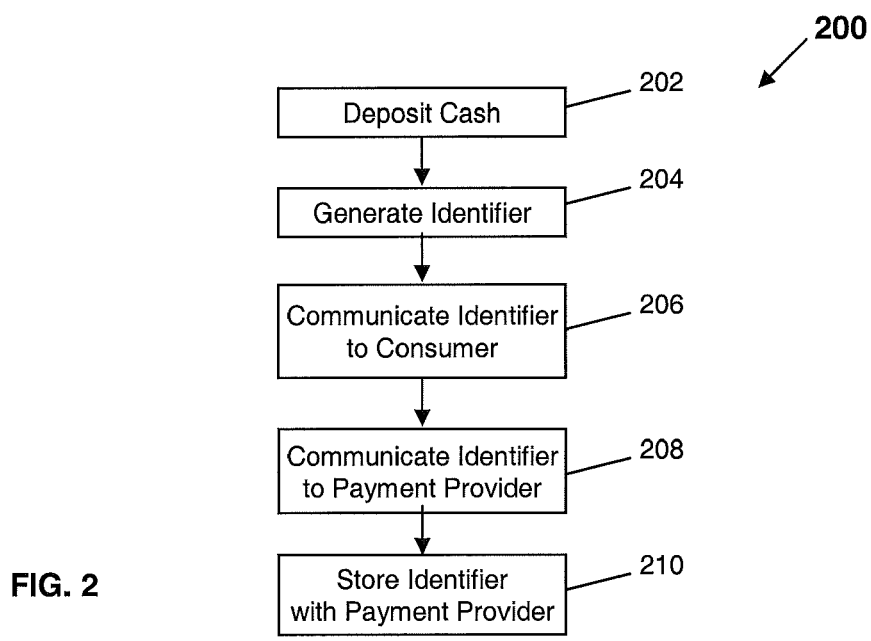

FUNDING ON-LINE ACCOUNTS

BACKGROUND

1. Field of the Invention

The present invention generally relates to financial transactions and more particularly to funding on-line accounts.

2. Related Art

With the ever-increasing popularity of the Internet and of Internet commerce, both consumers and sellers are using the Internet to facilitate financial transactions between buyers and sellers. One typical method is with a credit card. Another method is through the use of a bank or debit card. With both methods, a buyer enters specific information about the credit or bank card and the buyer, which allows the credit card company or bank to authenticate and authorize the on-line transaction. Thus, a consumer can easily purchase goods and services on-line without having to mail or personally deliver payment to the seller. In on-line financial transactions, customers may use third-party payment service providers to pay for products and services through electronic communications with on-line merchants over electronic networks, such as the Internet.

However, such methods and systems typically require the consumer to have a credit card or bank account. There may be large parts of the world where consumers do not have either. For credit cards, many may not qualify for a credit card for several reasons, such as no established credit or bad credit. For bank accounts, many may not trust banking or financial institutions, especially with banks defaulting. There may also be segments of the population that do not want their private information shared, which would be required when opening up a credit card or bank account, especially if those accounts are being used for on-line payments. Furthermore, there may be undeveloped areas where banks simply are not available. Thus, without a credit card or bank account, a large portion of the consumer market may not be able to participate in on-line transactions, which is disadvantageous to both consumers and sellers. For consumers, they are precluded from the many advantages of on-line purchases, such as convenience. For sellers, they lose a potentially large market of consumers for their goods and services.

SUMMARY

According to one embodiment, a system generates a unique character identifier when a consumer deposits cash. That identifier is associated with the cash amount and communicated to a financial services or payment provider, such as through the Internet or other communication medium. The consumer may then access and fund an on-line account with the financial services provider by first accessing the account, such as through a computer or mobile device. If the consumer has no account, an account can be created first. Once accessed or created, the consumer enters the unique character identifier, which the system processes. If the identifier is valid, e.g., an actual stored identifier within the system associated with a cash amount, then the system transfers that amount to the consumer's account. At this point, the consumer may use the account to make an on-line transaction or purchase with the newly funded amount. The consumer may also transfer funds from the on-line account to another person, such as a father to a child or other family member, enabling a safe, fast, and inexpensive transfer of cash, as opposed to companies that charge fees or require a bank to transfer money.

Consequently, consumers without access to or desire for credit cards or bank accounts may simply and easily participate in on-line financial transactions and purchases. Sellers increase their potential consumer base.

These and other features and advantages of the present invention will be more readily apparent from the detailed description of the embodiments set forth below taken in conjunction with the accompanying drawings.

BRIEF DESCRIPTION OF THE FIGURES

FIG. 1 is a block diagram of a system used for funding an on-line account according to one embodiment;

FIG. 2 is a flowchart showing steps used to fund an on-line account according to one embodiment;

Figure 3:
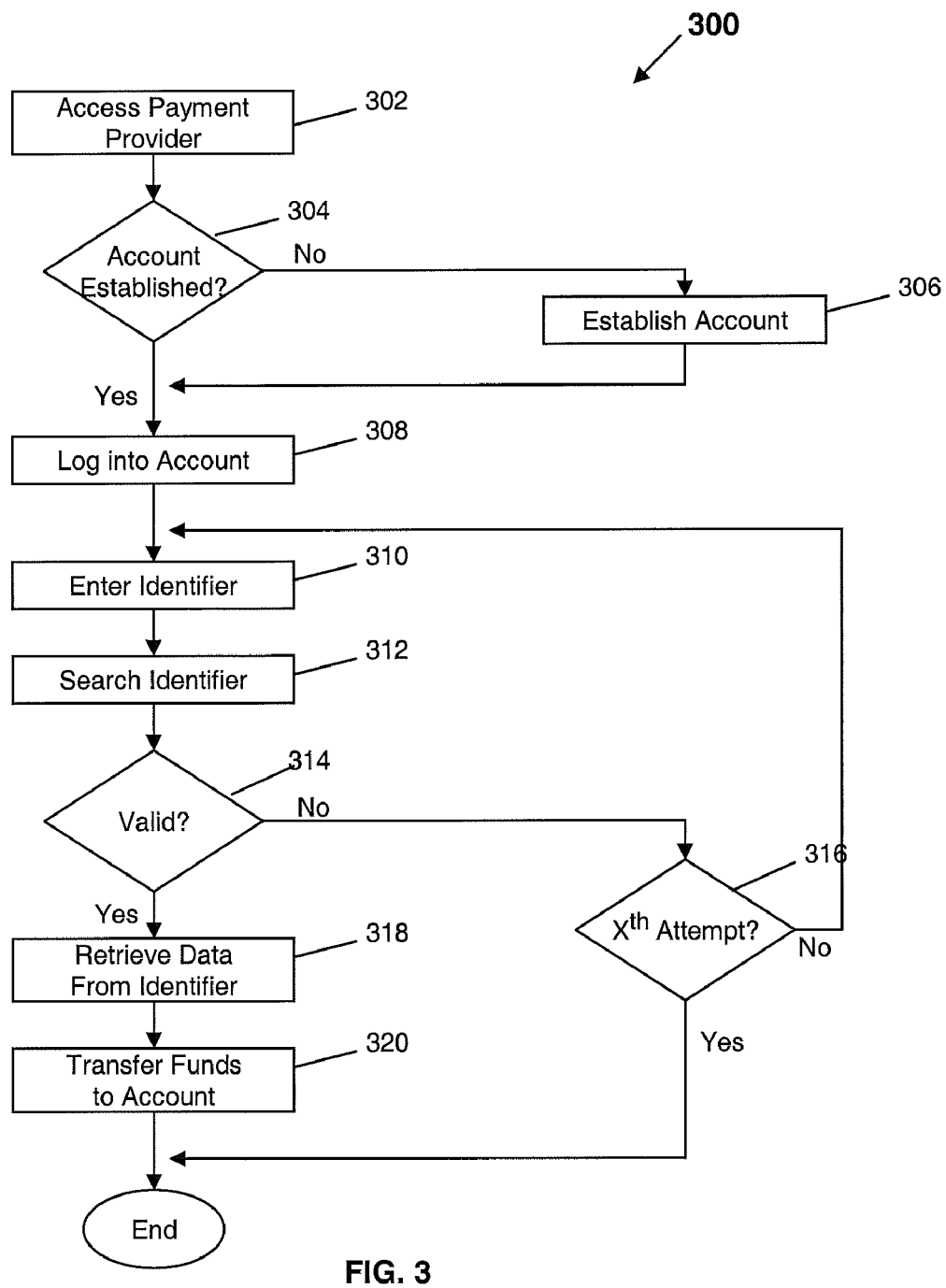
FIG. 3 is a flowchart showing a method for funding an on-line account according to another embodiment.

Exemplary embodiments and their advantages are best understood by referring to the detailed description that follows. It should be appreciated that like reference numerals are used to identify like elements illustrated in one or more of the figures, wherein showings therein are for purposes of illustrating exemplary embodiments and not for purposes of limiting the same.

DETAILED DESCRIPTION

Embodiments of the present disclosure enable consumers to use cash to fund an existing or newly created on-line account from a device that accepts cash, such as a kiosk, register, or automated teller machine. The device has the ability to communicate, such as through the Internet, with a financial services provider. In one embodiment, the consumer deposits cash into or with the device. This can be automated or a person may manually accept the cash. Once accepted, the consumer is given a unique alphanumeric character identifier associated with the just-deposited cash amount. This identifier may be generated at the device or by the financial services provider and then communicated to the device or consumer. The identifier may be given in any suitable format, such as a printed sheet or an encoded or printed card. This identifier is communicated to the financial services provider and stored (or just stored if generated by the financial services provider). Thus, at this point, both the consumer and the financial services provider have a unique identifier corresponding with a particular cash amount. However, no cash has actually been transferred to the consumer. To facilitate this, the consumer logs in or otherwise accesses the financial services provider system and retrieves his on-line account. If no on-line account exists, the consumer can create a new account. The consumer then enters the unique identifier, such as by typing it in a keyboard or touchpad or by inserting an encoded card. The system compares the identifier with ones stored in its memory. If there is a match, the cash amount associated with the identifier in the system memory is transferred to the consumer's on-line account for use.

FIG. 1 is a block diagram of a system 100 configured to enable a consumer to fund an on-line account using cash at a remote location, according to one embodiment. System 100 includes a consumer 102, a cash receiving device 104, and a payment provider system 106, and a consumer device 108, where communication is provided within the system and between consumer and devices through a single network 110 or a combination of multiple networks. For example network 110 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet. Note that payment provider system 106 may be any suitable payment provider that facilitates on-line financial transactions, such as PayPal, Inc. of San Jose, Calif.

Cash receiving device 104 has the capability of receiving cash from consumer 102. Cash receiving device 104 may be, but is not limited to, a kiosk, check-out register, automatic teller machine. Device 104 is not restricted to just machines. In one embodiment, device 104 may be a computer or processor combined with a person, in which the person actually receives the cash from consumer 102 and then enters the cash received into the computer or processor. In one embodiment, device 104 includes a reader 112, a processor 114, and a printer/encoder 116. Reader 112 is capable of determining the amount of cash deposited into device 104, such as are in standard ATM machines. Once device 104 determines the amount of cash deposited by consumer 102, processor 114, which is in communication with reader 112, generates a unique alphanumeric character identifier. The identifier may include any combination of numbers, letters (small or caps), and characters that are typically on a keyboard or touchpad. The length of the identifier can depend on the level of security desired. For example, a 12 character identifier may be virtually impossible for someone to correctly guess. However, longer identifiers may also be harder for consumer 102 to correctly input, as will be discussed.

Once the identifier is generated, processor 114 associates the deposited cash amount with that identifier. For example, an identifier of 8icSCWa80$@9MI may be associated with $100 deposited by consumer 102. If another consumer deposits $100, a different identifier will be generated and associated with that $100. So, there may be many different identifiers all associated with $100. The uniqueness is that each deposit is associated with a different identifier.

The identifier is then provided to consumer 102, such as through a printed sheet from printer/encoder 116. Consumer 102 can be provided this identifier in numerous ways, which may also include the number printed on any type of medium, encoded and printed as a barcode, or encoded into a magnetic strip or RFID tag. Device 104 communicates the identifier and associated money amount to payment provider system 106 through network 110.

Payment provider system 106 includes a user interface 118, a processor 120, a memory 122, and user accounts 124. User interface 118 receives information from network 110, such as the identifier and associated money amount transmitted by device 104. This information is processed by processor 120 and stored in memory 122. Memory 122 may be any suitable memory capable of storing, accessing, and reading the information.

After depositing the cash, consumer 102 can access payment provider system 106, such as via network 110 through consumer device 108. Consumer device 108 may be implemented using any appropriate combination of hardware and/or software configured for wired and/or wireless communication over network 110. For example, consumer device 108 may be implemented as a personal computer of consumer 102, a wireless telephone (e.g., cell phone), personal digital assistant (PDA), notebook computer, and/or various other generally known types of computing devices.

Once consumer 102 accesses payment provider system 106, such as logging onto its website, consumer 102 then accesses his on-line account. The on-line account is one in which the consumer can use to make on-line financial transactions. For example, in making an on-line purchase, the consumer may select his on-line account maintained and managed by payment provider system 106 as the funding source for the purchase. Payment provider system 106 then facilitates a transfer of funds to the seller's account, which may reside with payment provider system 106 or with another financial system, such as a bank.

If consumer 102 does not have an account with payment provider system 106, consumer 102 may create an account, which can be quickly and easily accomplished, such as simply entering personal information like an e-mail address and password. All accounts in payment provider system 106 are stored and accessible within user accounts 124. Once the account is created or accessed, consumer 102 enters the unique identifier provided earlier by device 104. This may be accomplished in various ways, including typing in the identifier from a printed sheet using the keypad or touchpad of consumer device 108, having a barcode read from a scanner on consumer device 108, or having an RFID chip read from a reader on consumer device 108. Once payment provider system 106 has an identifier, processor 120 searches memory 122 to determine whether that exact same identifier is stored in its memory. If so, i.e., identifier is validated, processor 120 determines the cash value associated with that identifier and transfers that amount to the on-line account of consumer 102 in user accounts 124.

FIG. 2 is a flowchart 200 showing one embodiment of depositing cash for later funding an on-line account. In step 202, a consumer or user deposits cash, which will later be used to fund the on-line account. The cash can be deposited in numerous ways. For example, a user may simply insert cash into a kiosk or machine that is able to determine the amount of cash deposited, such as an ATM machine. Other possible methods include handing the cash to a person, such as a teller or clerk, and then having that person enter the amount into a computer or machine that records the deposit. In some embodiments, the consumer may be asked to enter the cash amount or confirm the cash amount as a way to ensure that the deposit is accurately recorded. For example, a consumer may deposit 5 $20 dollar bills for a total deposit of $100. The receiving machine may then ask the consumer, on a screen or verbally, whether the consumer intends to deposit $80. In this situation, the machine has missed or mis-read the deposited cash. The consumer would say that this is not correct, and the deposited cash would be returned, wherein the consumer can re-start the deposit or transaction.

Once the cash is deposited, a unique alphanumeric character identifier is generated in step 204. The identifier may be a sequence of numbers, letters, characters, or some combination of two or more of the above. The identifier typically only includes numbers, letters, or characters that are found on a standard keyboard or touchpad. For example, if the system is being used in India, the identifier would include numbers, letters, or characters typically found on keyboard or touchpad devices in India. The length of the identifier may also be different, i.e., not a set length of X characters, numbers, and/or letters. If the system is expecting large numbers of transactions and/or security is a concern, a long identifier may be used to reduce the possibility of a random guess of the identifier. The length may be set manually by a system operator, revised as needed, or dynamically determined by the system itself, e.g., if the system has generated a large number of identifiers with increasing frequency, then the system may increase the length of the identifier. This identifier is unique to each transaction or deposit. So, even if the same person deposits $100 in two sequential transactions, two different identifiers will be generated, each associated with an individual $100 deposit.

In one embodiment, the identifier is generated by the machine receiving the deposit. In another embodiment, the identifier is generated by the payment provider or other device. For example, the amount of deposit may be communicated to the provider or other device, which then generates the unique identifier and communicates back to the cash-receiving machine or person. Note that "unique" does not necessarily require that once an identifier is generated, that same identifier can never be used again. In some embodiments, a specific identifier may be used again if the system determines that the identifier has been used by a consumer to fund an on-line account and/or a certain period of time has lapsed.

Once the identifier is generated, the identifier is provided or communicated to the consumer in step 206. There may be numerous ways to provide this identifier. In one embodiment, the consumer receives a printed "receipt" showing the numbers, characters, and/or letters of the identifier. In other embodiments, the consumer may receive a representation of the identifier that is not human readable, such as a printed barcode or an encoded RFID tag. With these representations, the consumer receives something tangible that can later be read. In yet other embodiments, the identifier may simply be shown on a screen, which the consumer then records, such as by writing it down on paper, taking a picture, scanning, etc.

If the identifier was generated by a device remote from the payment provider, the identifier is communicated to the payment provider in step 208. Communication can be over any suitable medium or method, such as, but not limited to the Internet. If the identifier was generated by the payment provider, no such communication is needed. Once the payment provider has the identifier, the identifier and its corresponding cash deposit amount are stored. This data can be stored in any suitable memory, either within the payment provider server or in an accessible location outside. In one embodiment, the memory is a memory that is readable and writable. At this point, the payment provider has a unique identifier associated with a specific dollar amount; however, no money has been transferred to the consumer's on-line account yet. The payment provider system and/or server may be provided by PayPal, Inc. of San Jose, Calif., USA.

FIG. 3 is a flowchart 300 showing one embodiment of funding an on-line account using a unique identifier. In step 302, the consumer accesses the payment provider, such as through the Internet, using any suitable device. For example, suitable consumer devices may include a PDA, a mobile phone, a laptop computer, or a desk top computer that has the ability to communicate with an on-line site. If the consumer does not have an on-line account with the payment provider, as determined in step 304, the consumer establishes an account in step 306. Establishing an account typically requires entry of some personal information, which can be as simple as entering an e-mail address or user name and a password. Additional information required may include security answers, name, mailing address, phone number, and bank or credit card account numbers. Once an account is established, the consumer logs onto the on-line account in step 308, such as by entering requested log-in information like an e-mail address or user name and password.

Once in the on-line account, the consumer is prompted to enter the unique identifier associated with an earlier cash deposit. In step 310, the consumer enters the identifier. Depending on the format, entry can be accomplished in a number of ways. For example, the consumer can simply look at a printed receipt and type in the identifier as it is shown on the receipt. If the identifier is in the form of a barcode, the consumer may be instructed to scan the barcode into the system. If the identifier is in the form of an RFID tag, the consumer may be instructed to have the RFID encoded tag be read into the system. Other methods of entering the unique identifier into the payment provider system may include near field communication (NFC), in which the identifier is stored into an NFC-enabled device at the point of deposit and then transferred to the payment account. With these types of methods, there should be a device capable of reading the identifier, as opposed to the consumer simply typing it in with a keyboard or touchpad.

After the identifier has been entered into the payment provider system, the identifier is searched, in step 312, to determine whether the identifier is valid. The entered identifier can be searched against identifiers stored in the payment provider system. The validity of the identifier is then determined in step 314. If there is no match, i.e., there is not the same identifier stored in the system, then the entered identifier is not valid. Even if there is a match, the identifier may not be valid. This situation may arise if the system does not delete previously used identifiers, such that the match may be with an old identifier that has already been used by another consumer. With systems that delete an identifier once it has been used, a match would then indicate that the entered identifier is valid.

If the identifier is not valid, the system may allow the consumer a set number X chances to re-enter the identifier, in step 316. That number X may be anything from 0 (no changes to re-enter) to 10 or more. The lower number of attempts, the less likely the consumer can simply enter a random number that matches with one stored in the system. With longer identifiers with different characters, the system may want to give the consumer multiple attempts because 1) the identifier may be easily mis-typed, and 2) the likelihood of entering in a random identifier and matching a stored identifier may be negligible. In addition to limiting the number of attempts during one log-in session, the system may similarly limit the number of attempts by all consumers or specific consumers within a day, week, month, or other period. For example, the system may prevent a consumer from continually logging onto and off of the system to bypass the per-session attempt limits. However, if a particular consumer has a history of frequent transactions, the system may allow that consumer more attempts over a period of time than the average consumer. If the consumer has reached the limit of attempts without entering a valid identifier, the system exits and the consumer is no longer able to enter additional identifiers.

If the consumer enters a valid identifier, the payment provider system retrieves data associated with the identifier in step 318. The data includes the amount of cash deposited in the transaction associated with the identifier, but may include other information, such as consumer information, transaction date, transaction place, etc. Next, in step 320, the payment provider system transfers the cash amount associated with the identifier into the consumer's on-line account. A confirmation may be given to the consumer, showing the transfer and available funds. After the transfer, the consumer can then utilize his on-line account to conduct financial transactions on-line, such as purchases from on-line merchants. For example, the consumer may select this particular payment provider as a funding source for an on-line purchase, which then facilitates the transaction and money transfer, which is well known, such as performed by PayPal, Inc. As a result, a consumer can participate in on-line financial purchases without having or using a bank account or credit card, but by simply depositing cash at suitable locations to fund an on-line account. Once funded, the consumer may also transfer cash on-line in a non-commercial transaction, such as between family members. For example, a father may want to give a child studying abroad some money, but does not trust the postal service or does not have a bank/credit card account. In this situation, money can be quickly and easily transferred anywhere in the world.

Figure 4:
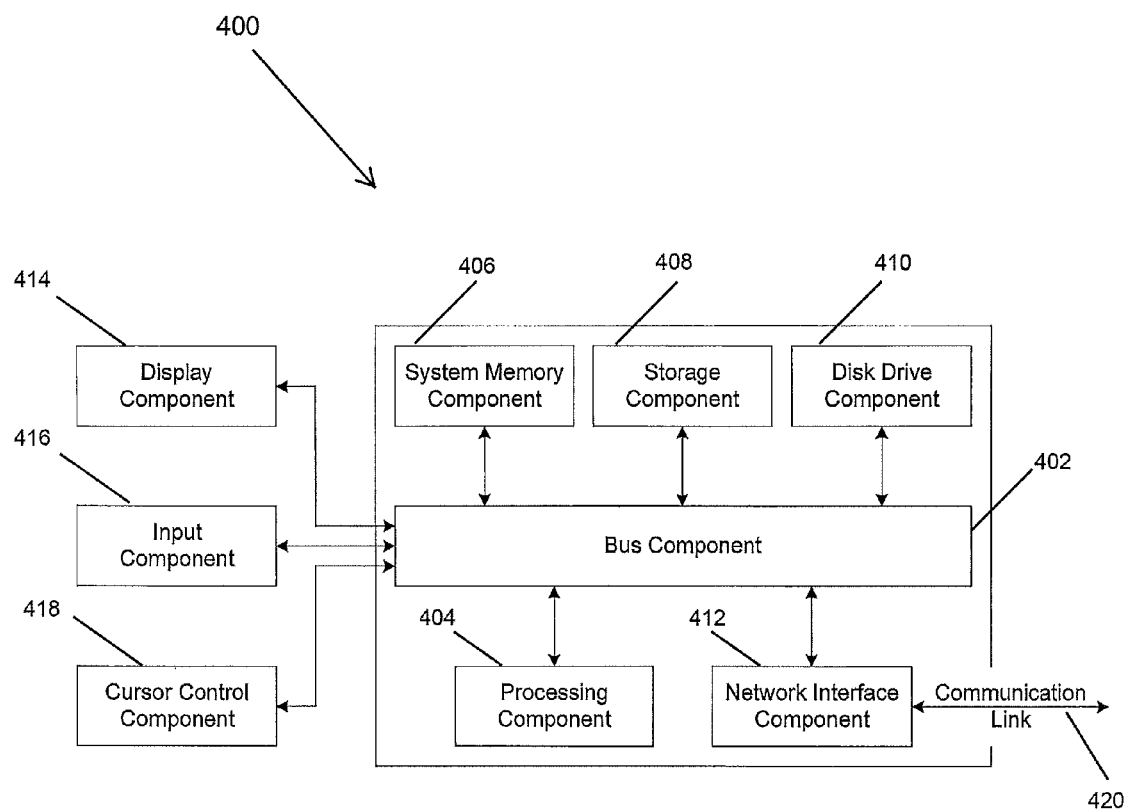
FIG. 4 is a block diagram of one embodiment of a system that can be used to implement one or more components of the system in FIG. 1.

FIG. 4 is a block diagram of a computer system 400 according to one embodiment, which may be suitable for implementing embodiments of various aspects of this disclosure, including, for example, device 104, device 108 and/or payment provider 106. In various implementations of various embodiments, device 104 and/or device 108 may comprise a personal computing device, such as a personal computer, laptop, PDA, cellular phone or other personal computing or communications devices. Payment provider 106 may comprise a network computing device, such as one or more servers, computer or processor combined to provide the payment services. Thus, it should be appreciated that devices 104, 108, and/or payment provider 106 may be implemented as computer system 400 in a manner as follows.

In one embodiment, computer system 400 may include a bus 402 or other communication mechanism for communicating information, which interconnects subsystems and components, such as a processing component 404 (e.g., processor, micro-controller, digital signal processor (DSP), etc.), a system memory component 406 (e.g., RAM), a static storage component 408 (e.g., ROM), a disk drive component 410 (e.g., magnetic or optical), a network interface component 412 (e.g., modem or Ethernet card), a display component 414 (e.g., CRT or LCD), an input component 416 (e.g., keyboard or keypad), and/or a cursor control component 418 (e.g., mouse or trackball). In one embodiment, disk drive component 410 may comprise a database having one or more disk drive components.

Computer system 400 may perform specific operations by processor 404 executing one or more sequences of one or more instructions contained in system memory component 406, according to steps described above with respect to FIGS. 1-3. Such instructions may be read into system memory component 406 from another computer readable medium, such as static storage component 408 or disk drive component 410. In other embodiments, hard-wired circuitry may be used in place of or in combination with software instructions to implement the invention.

Logic may be encoded in a computer readable medium, which may refer to any medium that participates in providing instructions to processor 404 for execution. Such a medium may take many forms, including but not limited to, non-volatile media, volatile media, and transmission media. In various implementations, non-volatile media includes optical or magnetic disks, such as disk drive component 410, volatile media includes dynamic memory, such as system memory component 406, and transmission media includes coaxial cables, copper wire, and fiber optics, including wires that comprise bus 402. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various example embodiments, execution of instruction sequences for practicing embodiments of the invention may be performed by computer system 400. In various other embodiments, a plurality of computer systems 400 coupled by communication link 420 (e.g., network 110 of FIG. 1, LAN, WLAN, PTSN, or various other wired or wireless networks) may perform instruction sequences to practice the invention in coordination with one another.

Computer system 400 may transmit and receive messages, data, information and instructions, including one or more programs (i.e., application code) through communication link 420 and communication interface 412. Received program code may be executed by processor 404 as received and/or stored in disk drive component 410 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

While the Figures and text focus on cash to fund an on-line account, other forms of "currency" or "value" may also be used, i.e., items having some sort of cash value. For example, a consumer may deposit coupons, vouchers, airline miles, store credits, gift cards, and basically anything tangible or readable (by machine or human) that has some value. A cash value can be assigned to each type of "currency" by the payment provider or other application or service. Thus, non-cash currency can be converted to a cash value and used to fund consumer on-line accounts to achieve the same benefits as discussed herein. The conversion can be performed at the site of the cash value deposit, with the payment provider, or from an outside service. In addition, having the ability to convert non-cash "currency" to cash enables consumers to potentially participate in greater numbers and/or higher value on-line transactions.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Although the description focuses on commercial transactions once the on-line account is funded, it is contemplated that the person funding the on-line account has the ability to transfer funds from that account anywhere in the world, even if not for a commercial transaction or purchase. For example, funds can be transferred to relatives or to a charity.

Having thus described embodiments of the invention, persons of ordinary skill in the art will recognize that changes may be made in form and detail without departing from the scope of the invention. Thus, the invention is limited only by the claims.

What is claimed is:

1. A method of funding an on-line account, comprising:
   storing, by a processor of a payment provider, a first identifier corresponding to a cash value deposit from a user into a cash receiving device having no account corresponding to the user, wherein the first identifier includes information about the amount of the cash value deposit and is known to the user and the payment provider after the cash value deposit;
   determining, by the processor, whether a second identifier provided by the user matches the first identifier and is valid; and
   transferring on-line, by the processor, a cash equivalent of the cash value deposit to an account of the user with the payment provider if the second identifier matches the first identifier and is valid.

2. The method of claim 1, wherein the first identifier is unique to each cash deposit.

3. The method of claim 1, wherein the first identifier comprises a sequence of characters, letters, and/or numbers.

4. The method of claim 1, further comprising receiving the first identifier from a remote cash value deposit location.

5. The method of claim 1, further comprising generating the first identifier.

6. The method of claim 1, wherein the cash value deposit is cash.

7. The method of claim 1, further comprising converting the cash value deposit to a cash value.

8. A method of funding an on-line account, comprising:
   receiving a cash value deposit from a user at a device having no account corresponding to the user;
   providing, by a processor, the user with a unique identifier associated with the cash value deposit; and
   communicating, by the processor, information about the cash value deposit to an on-line payment provider, wherein an on-line account of the user with the payment provider is funded on-line with a cash equivalent of the cash value deposit amount when the unique identifier is validated by the on-line payment provider.

9. The method of claim 8, wherein the receiving is via a machine.

10. The method of claim 8, further comprising generating the unique identifier after the receiving.

11. The method of claim 8, wherein the unique identifier comprises a sequence of characters, letters, and/or numbers.

12. The method of claim 8, further comprising receiving an entered cash amount from the user before the providing.

13. The method of claim 8, wherein the providing comprises printing the identifier on a receipt.

14. The method of claim 8, wherein the providing comprises encoding the identifier.

15. The method of claim 14, wherein the encoding comprises encoding an RFID tag or printing a barcode.

16. The method of claim 8, wherein the information comprises the unique identifier and cash value deposit amount.

17. A method of funding an on-line account, comprising: depositing a cash value item at a device having no account corresponding to the user; receiving, from a processor, a unique identifier associated with the cash value item; accessing the on-line account with a payment provider; inputting the unique identifier; and receiving, from the processor, confirmation of a cash equivalent of the cash value item transferred on-line into the on-line account with the payment provider if the unique identifier matches a valid identifier stored with the payment provider.

18. The method of claim 17, wherein the unique identifier comprises a sequence of characters, letters, and/or numbers.

19. The method of claim 17, wherein the cash value item is cash.

20. The method of claim 19, further comprising entering an amount of the cash to be deposited.

21. The method of claim 17, wherein the depositing and the accessing are at different locations.

22. A computer-readable medium containing instructions that cause a service provider facilitating financial transactions over a network to perform a method comprising:
   storing a first identifier corresponding to a cash value deposit from a user into a cash receiving device having no account corresponding to the user, wherein the first identifier includes information about the amount of the cash value deposit and is known to the user and a payment provider after the cash value deposit;
   determining whether a second identifier provided by a user matches the first identifier and is valid; and
   transferring on-line a cash equivalent of the cash value deposit to an account of the user with the payment provider if the second identifier matches the first identifier and is valid.

23. The computer-readable medium of claim 22, wherein the first identifier is unique to each cash value deposit.

24. The computer-readable medium of claim 22, wherein the first identifier comprises a sequence of characters, letters, and/or numbers.

25. The computer-readable medium of claim 22, wherein the method further comprises receiving the first identifier from a remote cash deposit location.

26. The computer-readable medium of claim 22, wherein the method further comprises generating the first identifier.

* * * * *